Figure 1:
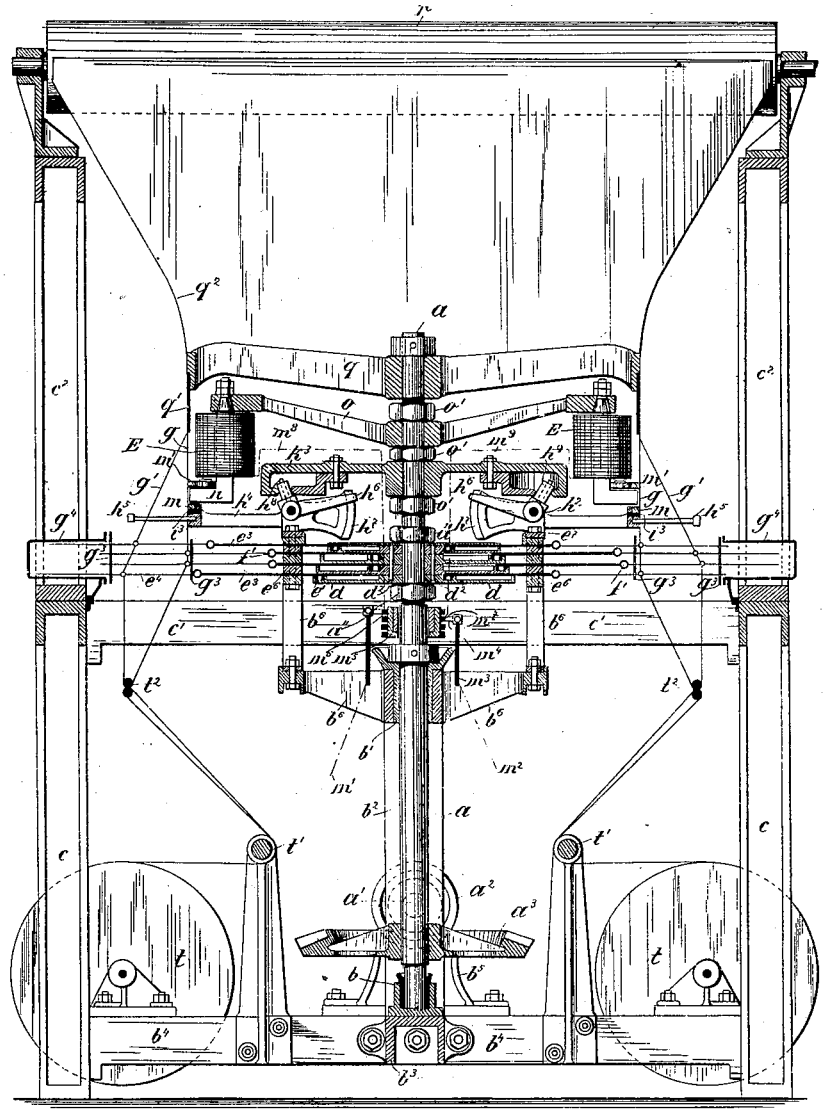

No. 628,093. Patented July 4, 1899.
J. & C. HEROLD.
CIRCULAR LOOM.
(Application filed June 25, 1898.)
(No Model.) 5 Sheets—Sheet 1.

Witnesses
H. van Oldenneel
Thos. Kirkpatrick

Inventors
Josef Herold
Carl Herold
by Allan A. Alexander
Attorney

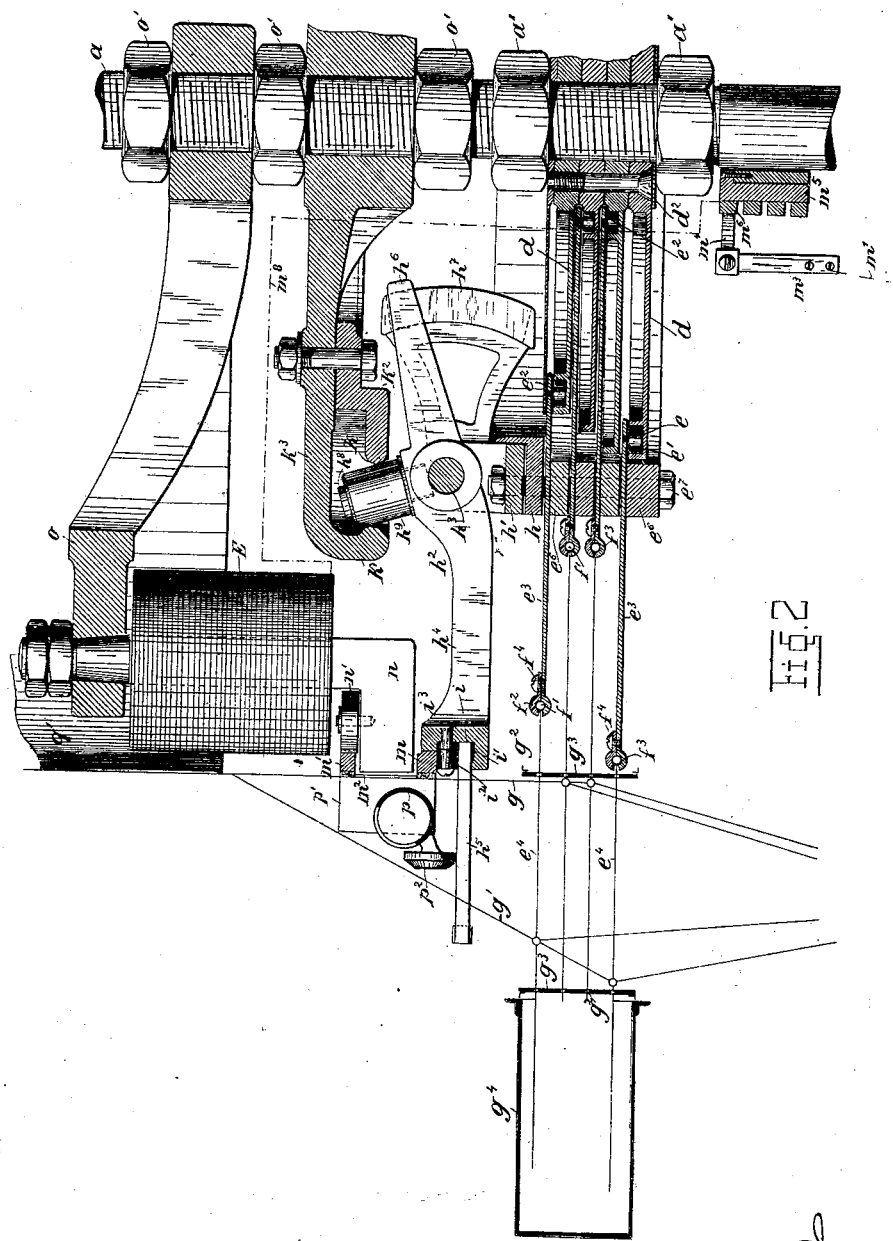

No. 628,093. Patented July 4, 1899.
J. & C. HEROLD.
CIRCULAR LOOM.
(Application filed June 25, 1898.)
(No Model.) 5 Sheets—Sheet 3.
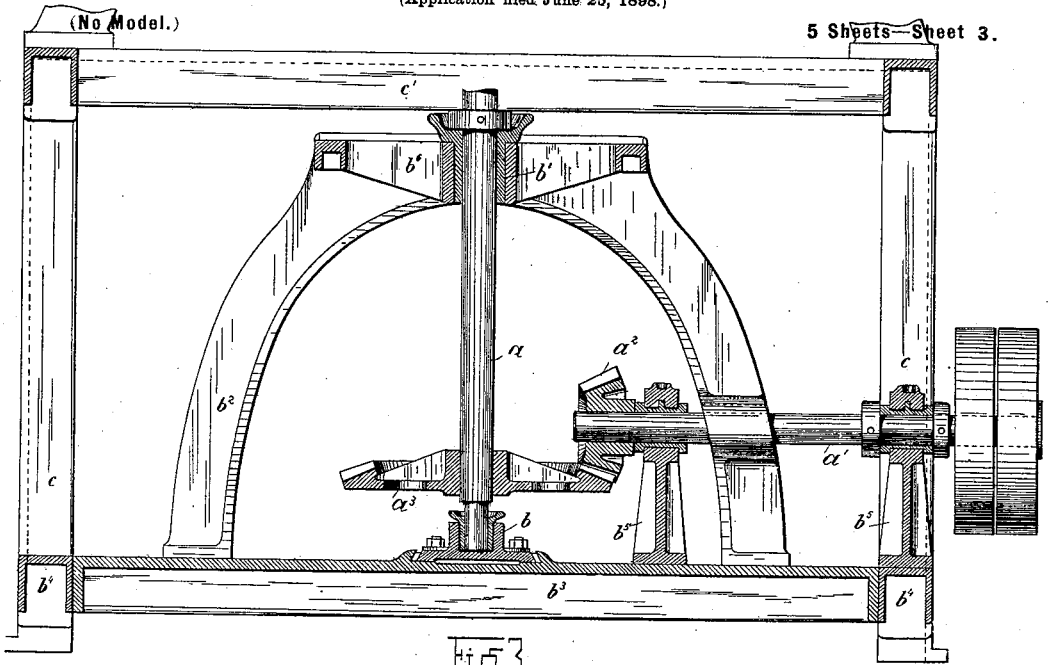
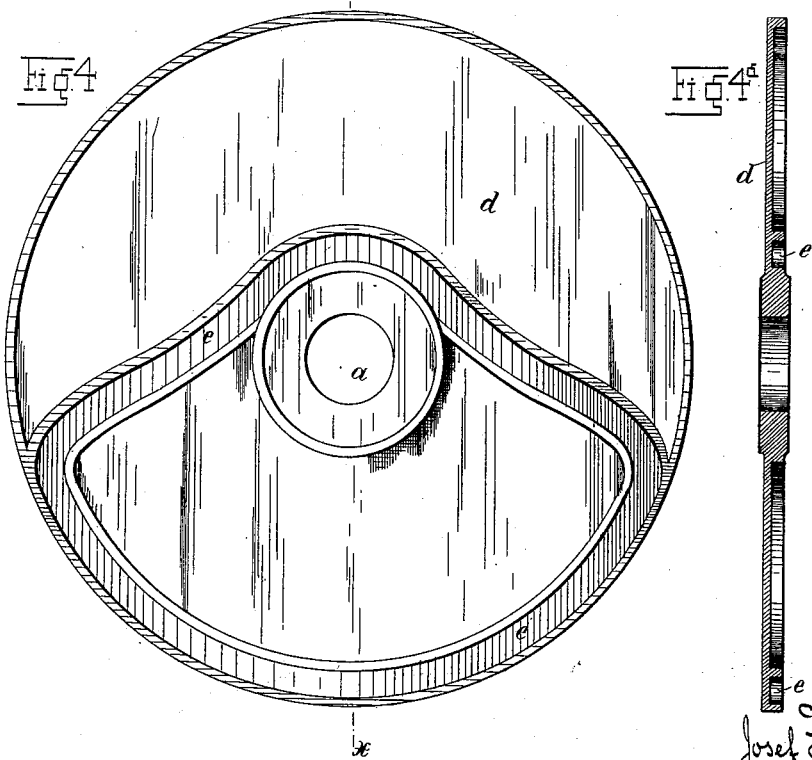
Witnesses
H. van Oldenneel
Thos. Kirkpatrick
Inventors
Josef Herold
Carl Herold
by Allan T. Alexander
Attorney No. 628,093. J. & C. HEROLD. Patented July 4, 1899.
CIRCULAR LOOM.
(Application filed June 25, 1898.)
(No Model.) 5 Sheets—Sheet 4.
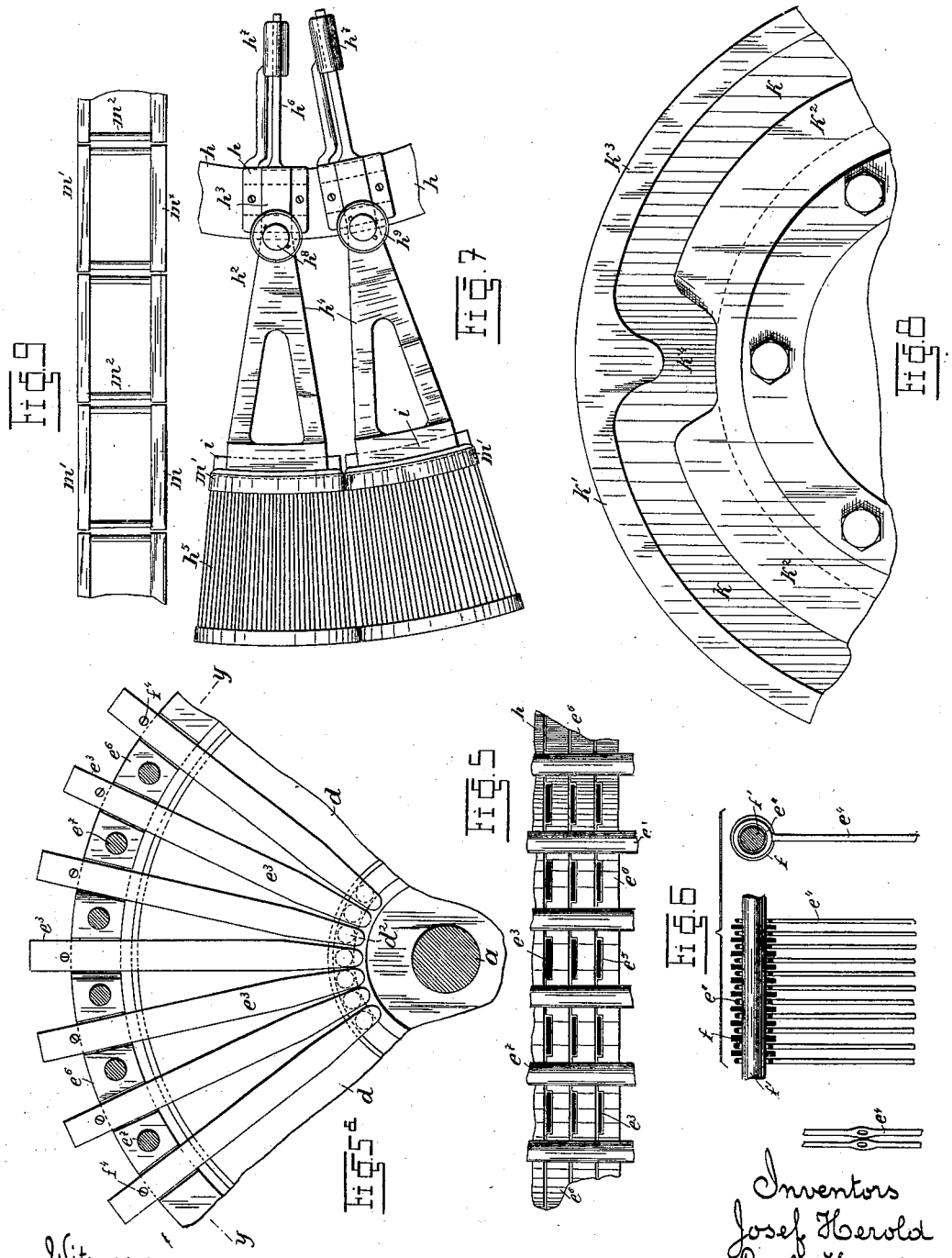

No. 628,093. Patented July 4, 1899.
J. & C. HEROLD.
CIRCULAR LOOM.
(Application filed June 25, 1898.)
(No Model.) 5 Sheets—Sheet 5.
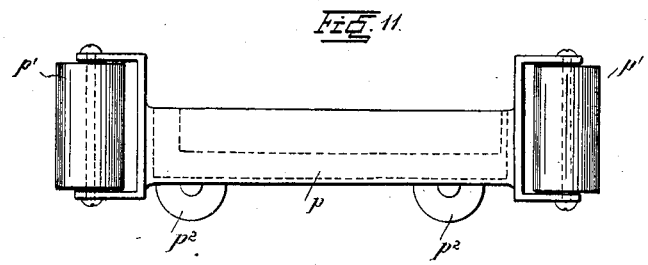
Fig. 11.
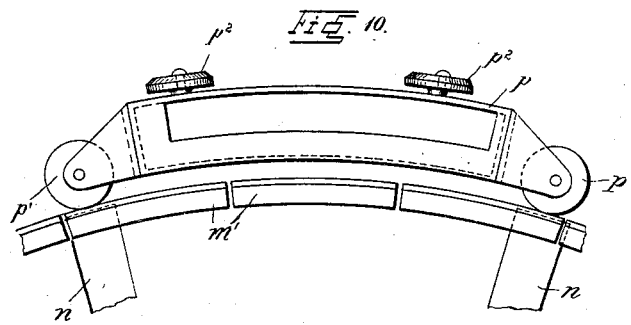
Fig. 10.
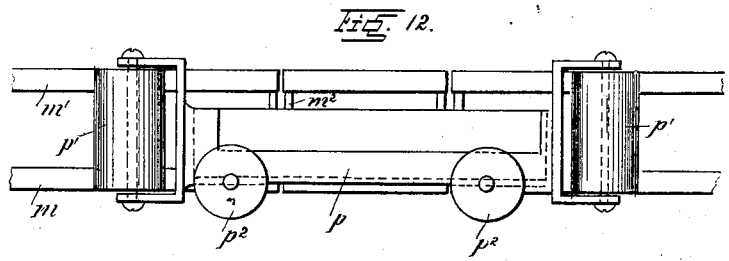
Fig. 12.
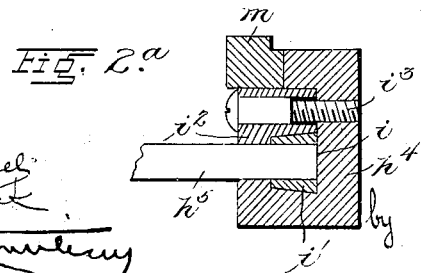
Fig. 2ª.
Witnesses
H. van Oldenneel
Thos. Kirkpatrick
Inventors
Josef Herold
Carl Herold
by Allan J. Alexander
Attorney

UNITED STATES PATENT OFFICE.

JOSEF HEROLD, OF BRÜNN, AND CARL HEROLD, OF KONIGSFELD, AUSTRIA-HUNGARY, ASSIGNORS TO RUNDWEBSTUHLFABRIK HEROLD & RICHARDS, OF BRÜNN, AUSTRIA-HUNGARY.

CIRCULAR LOOM.

SPECIFICATION forming part of Letters Patent No. 628,093, dated July 4, 1899.

Application filed June 25, 1898. Serial No. 684,502. (No model.)

*To all whom it may concern:*

Be it known that we, JOSEF HEROLD, manufacturer, of Lollhausglacis, in the city of Brünn, and CARL HEROLD, mill owner, of Konigsfeld, near Brünn, in the Empire of Austria-Hungary, subjects of the Emperor of Austria-Hungary, have invented certain new and useful Improvements in Circular Looms; and we do hereby declare the following to be a full, clear, and exact description of the invention, such as will enable others skilled in the art to which it appertains to make and use the same.

In the circular loom with electromagnetic shuttle-driving arrangement which is the subject of the present invention the shed is outside all the mechanical parts and the latter are driven by a single vertical shaft in the center.

In the accompanying drawings, Figure 1 is a vertical section of the loom; Fig. 2, a vertical section of part of the loom, on an enlarged scale, to illustrate more clearly the details; Fig. 2$^a$, an enlarged detail view showing the connection of the reed-segments to the arms; Fig. 3, a side elevation, partly in section, of the driving mechanism; Fig. 4, a plan of the eccentrics for forming the shed; Fig. 4$^a$, a section of the eccentric on $x\,x$, Fig. 4; Fig. 5, a sectional elevation on $y\,y$, Fig. 5$^a$; Fig. 5$^a$, a horizontal plan of the intermediate pieces $e^3$; Fig. 6, horizontal and vertical sections of the wire healds $e^4$, grouped together in sets upon the wire $f'$; Fig. 7, a plan of the lever $h^2$ and of the reed $h^5$; Fig. 8, a plan from below of the eccentric disk or cam $k^3$; Fig. 9, a front elevation of the circular segments $m$ $m'$; Fig. 10, an inside elevation of a shuttle; Fig. 11, a plan of shuttle; Fig. 12, an outside elevation of shuttle.

Motion is imparted to the vertical shaft $a$ from the horizontal shaft $a'$ by means of the beveled wheels $a^2\,a^3$. One end of the vertical shaft $a$ is supported in the foot-step $b$ and the other end in the collar $b'$, which latter is let into the pedestal or bracket $b^2$. The bracket $b^2$ is firmly screwed to the center cross rail or beam $b^3$, which connects the two beams $b^4$ of the frame. The pedestals $b^5$ of the shaft $a'$ are attached to the same frame. The remainder of the frame consists of two side uprights $c$, which are connected at the top by two cross-rails $c'$. Each of the latter carries a head-piece $c^2$, by which the cloth-rollers $r$ are supported.

Above the cross-rails $c'$ the eccentrics $d$ for the formation of the shed are placed upon the shaft $a$ and fixed on same by the nuts $a''$, while they are connected to each other by screws $d^2$. These shed-forming cams $d$, the number of which depends on the draft required for the cloth, (in the present instance the arrangement is for a four-leaved twill on both sides,) are shaped as shown in Figs. 4 and 4$^a$. In the grooves $e$ of these cams travel studs $e^2$, fitted with rollers $e'$, carried by the connecting rods or pieces $e^3$. These connecting rods or pieces $e^3$ are carried or supported by the radial horizontal slots $e^5$ of the rings $e^6$, which are connected with each other by screws $e^7$ and supported by the brackets $b^6$, bolted to the pedestal-bracket $b^2$. To the outer ends of the connecting-rods $e^3$ are attached the wire healds $e^4$, grouped together in sets. The attachment of the healds $e^4$ to the connecting-rods $e^3$ is effected so that each group or set of healds $e^4$ is by means of the disks or washers $f$, the diameters of which are rather larger than the eyes $e''$ of the healds, loosely placed upon the wire $f'$, the washers $f$ being held by the caps $f^2$ and screws $f^4$ in the clamp-shaped ends $f^3$ of the connecting-rods $e^3$. (See Figs. 6 and 2.) By this method of fastening the healds are allowed freedom of motion in all directions without risk of being bent or entangled, which would frequently occur if the healds $e^4$ were carried direct into the grooves $e$ of the cams $d$.

The grooved cams $d$ are shaped according to the kind of weave required and increase in diameter successively one below the other for the reason that the inner side $g$ of the shed, being perpendicular, forms a sharp angle with the outer one $g'$. The protrusion of the heald-wires $e^4$ will be greater the farther they are from the apex of the shed, and therefore the cams which cause the protrusion must have a proportionately greater throw. The healds $e^4$ are guided and supported by the apertures $g^2$ in the concentric metal plates $g^3$, and their outer ends when pushed out project into the annular cases $g^4$.

Upon the topmost ring $e^6$ an annular top $h$ is fastened by the above-mentioned screws $e^7$, and on this top the lever-bearings $h'$, arranged in a circle, are fixed by the same screws. (See also Fig. 7.)

The radially-arranged three-armed levers $h^2$ are pivoted on the studs or pins $h^3$ in the bearings $h'$, and their arms $h^8$, which are fitted with rollers $h^9$, move in the path $k$ of the rotating cam $k^3$, comprising the two parts $k'$ $k^2$ and fastened to the shaft $a$ by the nuts $o'$ $o'$. The arms $h^6$ slide in the part $h^7$, and the arms $h^4$ are each fitted with a groove $i$, in which are fastened by the wedges $i^2$ and screws $i^3$ the reed-segments $h^5$, which are provided with a wedge-shaped piece $i'$ on the upper side. (See Fig. 2.)

The diamagnetic circular segments $m$, which together form the bottom ring or race, against which the shuttles revolve or travel, are fastened to the upper parts of the lever-arms $h^4$. The diamagnetic circular segments $m'$ correspond to the circular segments $m$ and form the upper ring or race, against which the shuttles revolve or travel. The individual corresponding segments $m$ $m'$ are connected with each other by means of the pieces $m^2$. (See Figs. 2 and 9.)

Between the circular races formed by the segments $m$ $m'$ the magnets $n$ move, the poles of each of which carry a roller $n'$, which comes into contact with the segments $m'$ as the magnet $n$ revolves past them. By this means any protrusion of the individual segments $m'$ beyond the circular periphery of the shuttle-race is obviated, as well as any bending of the connecting-plates $m^2$. The electromagnets $n$ are carried by the arms $o$, which are fastened to the shaft $a$ by means of the nuts $o'$. These electromagnets $n$ receive the current from some source of current through the intermediary of a sliding contact arranged insulatingly on the shaft $a$. This contact consists of a ring $m^5$, made of some insulating material, (wood, hard rubber, ebonite, &c.,) upon which two brass rings $m^6$ $m^7$ are drawn. A brass spring $m^4$ slides upon each of said brass rings. The wires $m'$ $m^2$ coming from the source of current are connected with the supports $m^3$ of these contact-springs. On the other side the conducting-wires $m^8$ $m^9$ lead from the rings $m^6$ $m^7$ to the brass coils E. The shuttles $p$, impelled by the electromagnets $n$, travel with their pair of paramagnetic rollers $p'$ against the shuttle-race rings formed out of the circular segments $m$ $m'$ and with their pair of rollers $p^2$ onto the reed or batten $h^5$.

The temple-ring $q$ is placed loosely on the uppermost end of the shaft $a$. It carries at the bottom a metal cylinder $q'$ and passes upward into the funnel-shaped cloth-delivery part $q^2$, over which the finished web is carried between the take-up rollers $r$.

In operation the circular loom works as follows: The warp-threads pass from the warp-beams $t$, over the rail or beam $t'$ and cross-rings $t^2$, to the healds $e^4$, and are then drawn through the reed or batten $h^5$. The shuttles $p$, which are brought into the shed thus formed, are carried around in a circle by the rotating electromagnets $n$ and introduce the weft-threads. When a given length of the weft-thread has been carried into the shed and the magnets, with the shuttles, have passed, the arm $h^8$ enters the inwardly-inclined bend $k^4$ of the groove or path $k$ of the revolving cam $k^3$, whereby the lever $h^2$ is moved about its central pivot $h^3$ and the reed or batten $h^5$, carried at the end of the arm $h^4$, beats the weft upward into the cloth. This motion of the lever is rendered possible by the shuttle-rings being divided into segments $m$ $m'$ and participating in the upward movement. As soon as the weft is beaten up the levers $h^2$ resume their original position, owing to the arm $h^8$ reëntering the concentric part of the groove or path $k$ of the cam $k^3$. The heddle-cams $d$ open the shed before each shuttle and change it after the shuttle has passed, this movement being effected by the corresponding curves in the grooves $e$.

Having now particularly described and ascertained the nature of the said invention and in what manner the same is to be performed, we declare that what we claim is—

1. In a circular loom, the combination with a shuttle, of a plurality of levers, reeds carried by each lever, and two circular segments mounted one above the other on each lever adjacent to said reeds, the circular segments serving as a raceway for the shuttle, and a revoluble electromagnet having a pole-piece located between said segments substantially as described.

2. In a circular loom, the combination with a shuttle, of a revoluble electromagnet for actuating it, a plurality of radially-arranged levers, reeds on each lever, and a pair of connected diamagnetic circular segments on each lever, normally concentric with the path of the pole-pieces of the electromagnet, substantially as described.

3. In a circular loom, the combination with a shuttle, of rollers mounted on said shuttle, a revoluble electromagnet for actuating said shuttle, a roller on the magnet, a plurality of radially-arranged levers, reeds on each lever, and a pair of connected diamagnetic circular segments on each lever, affording a bearing for the rollers on the shuttle and the electromagnet, substantially as described.

4. In a circular loom, the combination with a rotatable shaft, of a plurality of radial heddles, stationary guides for said heddles, cams on said shaft for actuating the heddles, a plurality of reed-carrying levers fulcrumed to swing in radial planes, diamagnetic circular segments carried by said levers, and shuttle-actuating electromagnets mounted on the shaft and revoluble adjacent to said segments, substantially as described.

5. In a circular loom a raceway for the shuttle, a revoluble electromagnet having a bent pole-piece, and a roller mounted on said pole-piece, to run in contact with the raceway and determine the position of the pole-piece with reference to the shuttle, substantially as described.

6. In a circular loom, the combination with a three-armed lever, having one arm provided with a set of reeds, of a cam engaging with another arm, and a stationary guide engaging with the third arm, substantially as described.

7. In a circular loom, the combination with a stationary annular guide having tiers of radial openings, of radial connecting-rods received in said openings, a tier of cams for reciprocating said rods, heddles having eyes at one end, wires each passed through the eyes of a group of heddles, and clamps for attaching the wires and heddles to the rods, substantially as described.

8. In a circular loom, the combination with a group of heddles having eyes at one end, of a wire passed through said eyes, washers on the wire between the heddles, said washers being of larger diameter than the eyes of the heddles, a connecting-rod having at one end a groove to receive said washers, a clamping-piece secured to the rod and bearing upon said washers, whereby the heddles are loosely mounted on the rod, and an actuating-cam engaging the other end of the rod substantially as described.

9. In a circular loom, the combination with a group of heddles having eyes at one end, of washers larger in diameter than said eyes placed between the heddles, a wire passed through eyes and washers, and a clamp bearing upon the peripheries of the washers only, substantially as described.

In testimony whereof we have affixed our signatures in presence of two witnesses.

JOSEF HEROLD.
CARL HEROLD.

Witnesses:
MARIO VINNAST,
W. DRAHOSKONPIL.